3,514,434
PROCESS FOR THE POLYMERIZATION OF ALIPHATIC MONO-1-OLEFINS AND CATALYST THEREFOR
Lawrence M. Fodor, Bartlesville, Okla., assignor to Phillips Petroleum Company, a corporation of Delaware
No Drawing. Filed Feb. 15, 1965, Ser. No. 432,857
Int. Cl. C08f 1/56
U.S. Cl. 260—93.7      10 Claims

ABSTRACT OF THE DISCLOSURE

Yield and/or flexural modulus of polyolefins is improved and the xylene-solubles reduced by carrying out the polymerization with a catalyst formed on mixing (a) a preformed complex formed on mixing a compound of the formula $AlX_3$ and a compound of the formula $R_3M$, (b) a titanium trichloride-aluminum trichloride complex prepared by the reaction of titanium tetrachloride and aluminum and having the approximate formula $$TiCl_3 \cdot \tfrac{1}{3}AlCl_3$$

and (c) a compound having the formula $R_yM'X_z$ wherein R in the foregoing formula is selected from the group consisting of alkyl, aryl, cycloalkyl, alkenyl and cycloalkenyl radicals and combinations thereof such as alkaryl, aralkyl, etc., having 1 to 20 carbon atoms, more preferably 1 to 10 carbon atoms, M is a Group V–A element, preferably phosphorus, M' is a Group I–A, II or III–A metal, X is a halogen, preferably chlorine, bromine, or iodine, $y+z$ is equal to the valence of M', y is 1, 2 or 3, and z is 0, 1 or 2 (Periodic System of Lange, Handbook of Chemistry, 8th Edition, pages 56–57).

---

This invention relates to the polymerization of olefins to form solid polymers. In one aspect it relates to an improved catalyst for such a polymerization. In another aspect it relates to a process for producing solid polymers of olefins in increased yields.

It is known in the art to polymerize aliphatic 1-olefins such as propylene and 1-butene to form crystalline solid polymers. Catalysts for such a process are often formed by mixing together a compound having a metal-carbon bond with a compound of a transition metal. The activities of various of these catalysts can be improved by the addition of other compounds. Thus, for example, a catalyst which forms on the admixing of an alkylaluminum halide with a titanium halide can be improved by the addition to this mixture of a third component such as an organic phosphine. Still other components can be added to increase activity. Catalysts and processes of this type are disclosed in U.S. Pat. 2,832,759 (1958) and 3,051,692 (1962). It is also known to produce crystalline polypropylene in high yields by the use of a catalyst which forms on mixing a dialkylaluminum chloride or iodide with a complex which forms on the reaction of titanium tetrachloride with metallic aluminum. This type catalyst and process are disclosed in British Pat. 940,178.

Catalysts of the organometal type vary widely in activity and in the properties of the polymers which they produce. In the production of crystalline polypropylene, it is desirable to obtain not only high yields in the polymerization process but also a polymer which has a high flexural modulus. Very few catalysts among the many of this type which have been proposed in the art produce polypropylenes having the required flexural modulus in yields sufficiently high to be economical. While there have been various proposals to modify the activity of catalysts of the type hereinbefore referred to, many of the adjuvants do not increase yield without damaging other properties of the polymer, such as flexural modulus.

An object of this invention is to provide an improved catalyst. A further object of the invention is to increase yields of polyolefins such as polypropylene having the same or higher flexural modulus. A further object is to render catalyst systems having very low polymerization activity more active. A further object is to decrease the amount of noncrystalline polymer formed, as measured by decrease in xylene-soluble material. Other objects and advantages will become apparent to those skilled in the art upon considering this disclosure.

According to this invention, the yield and/or flexural modulus of polyolefins is improved and the xylene-solubles are reduced by carrying out the polymerization with a catalyst system formed on mixing (a) a preformed complex formed on mixing a compound of the formula $AlX_3$ and acompound of the formula $R_3M$, (b) a titanium trichloride-aluminum trichloride complex prepared by the reaction of titanium tetrachloride and aluminum and having the approximate formula $TiCl_3 \cdot \tfrac{1}{3}AlCl_3$ and (c) a compound having the formula $R_yM'X_z$ wherein R in the foregoing formulae is selected from the group consisting of alkyl, aryl, cycloalkyl, alkenyl and cycloalkenyl radicals and combinations thereof such as alkary, araky, etc., having 1 to 20 carbon atoms, more preferably 1 to 10 carbon atoms, M is a Group V–A element, preferably phosphorus, M' is a Group I–A, II or III–A metal, X is a halogen, preferably chlorine, bromine, or iodine, $y+z$ is equal to the valence of M', y is 1, 2 or 3, and z is 0, 1 or 2 (Periodic System of Lange, Handbook of Chemistry, 8th Edition, pages 56–57).

The enumeration of alkyl, cycloalkyl and aryl radicals herein in defining the formulae is intended to include the various mixed radicals such as alkaryl, aralkyl, etc.

In forming the foregoing catalyst, the molar ratio of both the $R_3M \cdot AlX_3$ complex and the $R_yM'X_z$ organometal to the titanium complex (as $TiCl_3 \cdot \tfrac{1}{3}AlCl_3$) is in the range 0.01:1 to 10:1, preferably 0.5:1 to 7:1, and more preferably 1:1 to 5:1. The stated ranges are those which provide the most satisfactory results; however, ratios outside these ranges can be used.

The organo-Group V–A compounds ($R_3M$) utilized to form the preformed complex in the catalyst according to this invention are also well known in the art. They include triethyl phosphine, tri-n-butyl phosphine, ethyl ditert-butyl phosphine, tricyclohexyl phosphine, triphenylphosphine, the tritolyl phosphines, the tricresyl phosphines, tribenzyl phosphine, triethylamine, tribenzylamine, triphenylamine, tricyclohexylamine, trinonylamine, trihexadecylamine, trieicosylamine, trivinylamine, triallylamine, tri(5-octenyl)amine, tri(3-methylcyclopentyl)amine, tri(3 - allylphenyl)amine, tri(2 - naphthyl)amine, tri(9-anthryl)amine, tripropylarsine, tri(phenylbutyl)arsine, triethylarsine, triphenylarsine, tribenzylarsine, tri(10-phenanthryl)amine, tri(3-allylcyclohexyl)amine, tri(5,6-dimethyl-1-chrysenyl)amine, triethylstibine, tributylstibine, tribenzylstibine, triphenylstibine, tridodecylstibine, trioctadecylstibine, tri(5-decenyl)stibine, tri-(2-pyrenyl)stibine, tri(2-cyclohexenyl)stibine, triethylbismuthine, triphenylbismuthine, tribenzybismuthine, trihexylbismuthine, tri(3-hexadecenyl)bismuthine, tri(3,4-dimethyl-5,6-diisobutyl - 1 - naphthyl)bismuthine, triallylbismuthine, tricyclopentylbismuthine, tri(2,3-dihexylcyclohexyl)bismuthine, and the like. The $AlX_3$ used to form the preformed complex used in the catalyst according to this invention includes aluminum fluoride, aluminum chloride, aluminum bromide, and aluminum iodide. The complex is formed by mixing the $R_3M$ compound and the $AlX_3$ compound in a small amount of a solvent selected from those hereinafter listed for 1 to 5 hours at a temperature of 80° to 160° F. The $R_3M$ and $AlX_3$ compounds are usually used in a 1:1 mol ratio, but a small excess of the $R_3M$ compound can be used.

The organometal compounds ($R_yM'X_z$) used in accordance with this invention are also well known in the art. They include diethylzinc, diisopropylzinc, di-n-butylzinc, di-n-octylzinc, dicyclopentylzinc, dicyclohexylzinc, diphenylzinc, phenylparatolylzinc, di-betanaphthylzinc, n-butyllithium, diethylcadmium, diethylmagnesium, triethylaluminum, triethylgallium, isooctylsodium, phenylpotassium, 1-naphthylrubidium, ethylberyllium fluoride, 7-phenanthylcalcium iodide, 3 - hexylcyclohexylmercury bromide, allylbarium chloride, dieicosylzinc, di-10-hexadecenylindium chloride, trihexylboron, diethylaluminum chloride, ethylaluminum dichloride, triphenylgallium, tribenzylthallium, tri-1-naphthacenylaluminum, 2-phenyl-4-cyclohexenylstrontium chloride, ditolylgallium bromide, tri(7,8-dimethylchrysenyl)aluminum, di(3,4-diisopropyl-7,8-diethylnaphthyl)gallium chloride, diallylmagnesium, dioctylgallium iodide, and the like. Mixtures of two or more of the compounds in each group of catalyst ingredients can be employed if desired.

The olefins which are polymerizable in accordance with this invention are aliphatic olefins having up to 8 carbon atoms per molecule, e.g. ethylene, propylene, 1-butene, 1-pentene, 1-hexene, 1-heptene, 4-methyl-1-pentene, and octene-1. The greatest benefits are obtained in the polymerization of aliphatic 1-olefins having from 3 to 7 carbon atoms per molecule.

The polymerization reaction is carried out in liquid olefin or in an inert liquid hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. When a solvent is used, the volume ratio of solvent to propylene is in the range of 1:1 to 10:1, preferably 3:1 to 7:1.

The polymerization is most frequently conducted in the temperature range 80° to 250° F., and more frequently 100° to 200° F. The pressure used is sufficient to maintain the reaction mixture substantially in the liquid phase. While an inert hydrocarbon diluent, e.g. a paraffin, cycloparaffin, or aromatic hydrocarbon having up to 20 carbon atoms per molecule, can be utilized, it is frequently advantageous to conduct the reaction without a diluent, especially when propylene is being polymerized. Under these circumstances, liquid propylene acts as the reaction medium. The reaction time is generally in the range 10 minutes to 50 hours, more frequently 30 minutes to 25 hours.

It is frequently desirable, for controlling the molecular weight of the polymer, to utilize from about 0.08 to about 0.30 mol percent of hydrogen in the system. When propylene is being polymerized in a mass polymerization system, it is desirable to dissolve this amount of hydrogen in the liquid propylene before passing the propylene into the polymerization reactor.

The total catalyst concentration in the reaction mixtures according to this invention is usually in the range 0.005 to 10 weight percent, but concentrations outside this range are operative.

The product polymers in accordance with this invention can be recovered from the reaction mixture by processes well known in the prior art. Thus the product polymer can be contacted with a chelating compound such as a diketone to remove catalyst residues and further contacted with a hydrocarbon such as n-pentane or liquid propylene to remove remaining traces of catalyst and chelating agent as well as any small amount of polymer fraction which may be soluble in light hydrocarbons at temperatures of the order of 80° to 100° F.

In the commercial production of polypropylene, it is desirable that the production of noncrystalline polymer, as measured by xylene-soluble content, be maintained at a low level. One advantage of this invention is that product polymer contains only small amounts of xylene-soluble material. The percentage xylene-soluble material is determined by placing 0.95 gram of polymer in a 100-ml. centrifuge tube, adding 95 ml. of xylene, heating 15 minutes at 285° F., cooling, centrifuging, evaporating the solvent from a 25-ml. aliquot of the supernatant liquid, weighing the residue, and multiplying by 400.

The following example will serve to illustrate the invention, although it is not intended that the invention be limited thereto.

Example

In a series of runs illustrating specific embodiments of this invention, propylene was polymerized in a solution system, i.e., using pentane as a diluent. The runs were carried out for 18 to 22 hours at 122° F. and 35 to 45 p.s.i.a. About 50 cc. (30 grams) of propylene and 250 cc. pentane was employed.

The following results were obtained:

TABLE

| Run No. | Mol ratio Organometal:AlCl$_3$·$\phi_3$P:TiCl$_3$·⅓AlCl$_3$ | Organometal used | Total catalyst conc., wt. percent [1] | Rate, g./g. Ti compd./hr. | Xylene sol., percent | Flex. mod.,[2] p.s.i.×10$^{-3}$ |
|---|---|---|---|---|---|---|
| 1 | 4:2·2:1 | DEZ | 2.3 | 10.3 | 2.6 | 249 |
| 2 | 4:0·0:1 | DEZ | 2.4 | 3.7 | 4.6 | 254 |
| 3 | 0:2·2:1 | | 3.3 | 0 | | |
| 4 [3] | 4:2·2:1 | DEZ | 2.6 | 0 | | |
| 5 | 2:0·0:1 | TEA | 0.75 | 13.9 | 31.5 | 38 |
| 6 | 2:2·2:1 | TEA | 1.9 | 12.0 | 2.3 | 172 |
| 7 | 2:0·0:1 | TEA | 1.2 | 5.0 | 9.3 | 134 |
| 8 | 2:2·0:1 | TEA | 1.6 | 13.9 | 28.3 | 44 |
| 9 | 2:2·2:1 | DEAC | 2.1 | 4.6 | 0.9 | 199 |
| 10 [3] | 2:2·2:1 | DEAC | 2.2 | 4.4 | 19.7 | 95 |

[1] Based on propylene.
[2] ASTM D 790-61.
[3] AlCl$_3$ and $\phi_3$P not premixed.

NOTE.—DEZ=Diethylzinc, TEA=Triethylaluminum, DEAC=diethylaluminum chloride, $\phi_3$P=Triphenylphosphine.

The foregoing runs clearly indicate the invention. The utilization of the premixed complex as a catalyst component resulted in improvement in polymer yield, as measured by polymerization rate, and/or polymer modulus, and in a reduction in xylene-solubles. In runs 4 and 10, in which the R$_3$M and AlX$_3$ components were not premixed, it is apparent that with diethylzinc no polymer was obtained, and that with diethylaluminum chloride excessive xylene-soluble polymer was formed and the product had low modulus. Results obtained without the premixed complex or with only one ingredient of the complex were poor in one or more respects.

Reasonable variations and modifications can be made, or followed, in view of the foregoing, without departing from the spirit and scope of this invention.

I claim:

1. A process which comprises polymerizing an aliphatic 1-monoolefin having up to 8 carbon atoms per molecule in the presence of a catalyst which forms on mixing (a) a preformed complex formed by combining a compound of the formula AlX$_3$ and a compound of the formula R$_3$M, (b) a titanium trichloride-aluminum trichloride complex having the approximate formula TiCl$_3$·⅓AlCl$_3$ and (c) a compound having the formula R$_y$M′X$_z$ wherein R in the formula is selected from the group consisting of alkyl, cycloalkyl, aryl, alkenyl and cycloalkenyl radicals having from 1 to 20 carbon atoms per molecule and combinations thereof, X is a halogen, M is phosphorus, M' is a member of the group consisting of I–A, II and III–A metals, $y+z$ is equal to the valence of M', $y$ is an integer from 1 to 3, $z$ is an integer from 0 to 2, and the molar ratio of each of the components (a) and (c) to the titanium trichloride-allminum trichloride complex (b) being in the range of 0.01:1 to 10:1.

2. A process according to claim 1 wherein the catalyst is formed by mixing a preformed complex consisting of triphenyl phosphine and aluminum trichloride with titanium trichloride-aluminum chloride complex and diethylzinc.

3. A process according to claim 1 wherein the catalyst is formed by mixing a preformed complex consisting of triphenyl phosphine and aluminum trichloride with titanium trichloride-aluminum chloride complex and triethylaluminum.

4. A process according to claim 1 wherein the catalyst is formed by mixing a preformed complex consisting of triphenyl phosphine and aluminum trichloride with titanium trichloride-aluminum chloride complex and diethylaluminum chloride.

5. A process which comprises polymerizing propylene in the presence of a catalyst which forms on mixing (a) a dialkylzinc wherein the alkyl group contains from 1 to 10 carbon atoms each, (b) a titanium trichloride-aluminum trichloride complex having the formula $$TiCl_3 \cdot \tfrac{1}{3} 3AlCl_3$$

and (c) a preformed complex formed by mixing triphenyl phosphine and aluminum trichloride, the polymerization being conducted in the liquid phase at a temperature in the range 80° to 250° F., the molar ratio of each of said components (a) and (c) to titanium trichloride complex being in the range 0.01:1 to 10:1.

6. A process according to claim 5 which comprises polymerizing propylene at a temperature in the range 100° to 200° F. in the presence of a catalyst which forms on mixing a preformed complex of triphenyl phosphine and aluminum trichloride, titanium trichloride-aluminum trichloride complex, and diethylzinc, the molar ratio of the preformed complex and the diethylzinc to the titanium chloride complex being in the range 1:1 to 5:1.

7. A catalyst which forms on admixing (a) a preformed complex formed on mixing a compound of the formula $AlX_3$ and a compound of the formula $R_3M$, (b) a titanium trichloride-aluminum trichloride complex having the approximate formula $TiCl_3 \cdot \tfrac{1}{3} AlCl_3$ prepared by the reaction of titanium tetrachloride and aluminum, and (c) a compound having the formula $R_yM'X_z$ wherein R in the foregoing formulae is selected from the group consisting of alkyl, aryl, cycloalkyl, alkenyl and cycloalkenyl radicals and combinations thereof having 1 to 20 carbon atoms, M is phosphorus, M' is a metal selected from the group consisting of group I–A, II and III–A metals, X is a halogen, $y+z$ is equal to the valence of M', $y$ is an integer of from 1 to 3, $z$ is an integer of from 0 to 2, and the molar ratio of each of the components (a) and (c) to the titanium trichloride-aluminum trichloride complex (b) being in the range of 0.01:1 to 10:1.

8. A catalyst system according to claim 7 formed by mixing a preformed complex consisting of triphenyl phosphine and aluminum trichloride with titanium trichloride-aluminum chloride complex and diethylzinc.

9. A catalyst system according to claim 7 formed by mixing a preformed complex consisting of triphenyl phosphine and aluminum trichloride with titanium trichloride-aluminum chloride complex and triethylaluminum.

10. A catalyst system according to claim 7 formed by mixing a preformed complex consisting of triphenyl phosphine and aluminum trichloride with titanium trichloride-aluminum chloride complex and diethylaluminum chloride.

References Cited

UNITED STATES PATENTS

| 3,325,424 | 6/1967 | Tornquist et al. | 252—442 |
| 3,342,793 | 9/1967 | Palvarini et al. | 260—93.7 |
| 3,367,927 | 2/1968 | Stryker et al. | 260—93.7 |
| 3,269,996 | 8/1966 | Langer | 260—93.7 |

FOREIGN PATENTS 1,231,090   9/1960   France.

JOSEPH L. SCHOFER, Primary Examiner

E. J. SMITH, Assistant Examiner

U.S. Cl. X.R.

252—429; 260—94.9